United States Patent
Sokoll et al.

(10) Patent No.: US 9,841,745 B2
(45) Date of Patent: Dec. 12, 2017

(54) MACHINE CONTROLLER AND METHOD FOR CONTROLLING A MACHINE

(71) Applicant: Robert Bosch GmbH, Stuttgart (DE)

(72) Inventors: Andreas Sokoll, Zellingen (DE); Christopher Sokoll, Himmelstadt (DE)

(73) Assignee: Robert Bosch GmbH, Stuttgart (DE)

( * ) Notice: Subject to any disclaimer, the term of this patent is extended or adjusted under 35 U.S.C. 154(b) by 565 days.

(21) Appl. No.: 14/031,640

(22) Filed: Sep. 19, 2013

(65) Prior Publication Data

US 2014/0088737 A1  Mar. 27, 2014

(30) Foreign Application Priority Data

Sep. 21, 2012  (DE) .................. 10 2012 018 713

(51) Int. Cl.
*G05B 19/048* (2006.01)
*G05B 19/042* (2006.01)

(52) U.S. Cl.
CPC .......... *G05B 19/048* (2013.01); *G05B 19/042* (2013.01); *G05B 2219/23018* (2013.01)

(58) Field of Classification Search
CPC .......... G06F 2203/04104; G06F 3/041; G06F 3/0412; G06F 3/0414; G06F 3/0416; G05B 19/048; G05B 19/042; G05B 2219/2301

See application file for complete search history.

(56) References Cited

U.S. PATENT DOCUMENTS

| | | | | |
|---|---|---|---|---|
| 2011/0148572 A1* | 6/2011 | Ku | ............... | G06F 3/04883 340/5.51 |
| 2011/0210931 A1* | 9/2011 | Shai | ............... | G06F 3/014 345/173 |
| 2012/0056732 A1* | 3/2012 | Bergmeier | ........... | G08C 17/00 340/12.54 |
| 2012/0249439 A1* | 10/2012 | Kawate | ............ | G06F 3/04886 345/173 |

* cited by examiner

*Primary Examiner* — Kenneth Bukowski
(74) *Attorney, Agent, or Firm* — Maginot, Moore & Beck LLP

(57) ABSTRACT

A machine having at least one drive and at least one input device for inputting control commands for controlling the drive, the input device being configured in such a manner that at least occasionally at least two different actuating actions must be performed by a user on the input device in order to output a control command to the drive. The input device has a display device with a touch-sensitive surface in such a manner that inputs can be made by touching the surface. The display device at least occasionally displays a first symbol in a first region of the surface. A first input is able to be made by touching this symbol. The display device at least occasionally displays a second symbol in a second region of the surface. A second input is able to be made by touching the second symbol.

10 Claims, 1 Drawing Sheet

MACHINE CONTROLLER AND METHOD FOR CONTROLLING A MACHINE

This application claims priority under 35 U.S.C. §119 to patent application no. DE 10 2012 018 713.0, filed on Sep. 21, 2012 in Germany, the disclosure of which is incorporated herein by reference in its entirety.

BACKGROUND

The present disclosure relates to a machine and, in particular, to an apparatus and a method for controlling this machine. The prior art discloses various machines which have, in particular, drives which may also be hazardous to the user. Various procedures for increasing the safety for machine users are known from the prior art. For example, it is known that injuries to the machine operator caused by an undesirable movement are avoided by means of a two-handed operating concept. In this case, the machine operator must use both hands at the same time to trigger certain switching mechanisms in order to thus start the machine. This makes it possible to avoid one of the operator's two hands staying in a hazardous region of the machine and thus being able to be injured, for example. Such concepts are referred to as confirm buttons, for example. Corresponding procedures are also recorded in machine guidelines in this case.

In particular, confirm concepts with, in particular, separate confirm switching devices or confirm buttons are also known from the prior art. The present disclosure therefore relates, in particular, to possibilities which make it possible to safely move drive systems and, in particular, linear systems, the disclosure being able to be used in automation technology, in particular.

Recently, modern visualization devices, for example smart devices, for example iPads, iPods and the like, are also being used more and more frequently in the field of automation technology. In this case, such devices usually do not have a separate confirm button.

Therefore, the present disclosure is based on the object of also ensuring the confirm mechanisms, which are sometimes required in the prior art or in various guidelines, for the mentioned modern drives having smart devices. These objects are achieved, according to the disclosure, by the subject matters of the independent claims. The subclaims relate to advantageous embodiments and developments.

SUMMARY

A machine according to the disclosure has at least one drive and at least one input device for inputting control commands for controlling the drive. In this case, the input device is configured in such a manner that at least occasionally at least two different actuating actions must be performed by a user on the input device in order to output a predefined control command to the drive.

According to the disclosure, the input device has a display device with a touch-sensitive surface in such a manner that inputs can be made by touching this surface. Furthermore, the display device at least occasionally displays a first symbol in a first region of this surface, an input being able to be made by touching this symbol. Furthermore, the display device at least occasionally displays a second symbol in a second region of the surface, a second input being able to be made by touching this second symbol. A processor device is also provided, which processor device is configured in such a manner that a predefined control command is output to the drive or is executed by the drive only when the first symbol and the second symbol are or have been touched.

The control commands mentioned are understood as meaning, in particular, a command which moves the drive or changes movement parameters of this drive, for example a speed, a direction of movement, an acceleration and the like.

A symbol is understood as meaning any symbol which can be represented graphically and stands out from a further symbol or a background.

It is thus proposed to configure the display device in such a manner that it also enables machine actuation by means of confirm switching. In this case, the two symbols must therefore be at least occasionally actuated, as a result of which the second symbol looks after the function of a confirm button, for example. This also makes it possible to prevent undesired actuation of the machine by the user, in which case the apparatus according to the disclosure manages, in particular, without an additional or separate confirm button. In this case, it is preferably possible for at least one of the two symbols to be displayed only depending on the situation, in particular when precisely a command which requires confirmation by a confirm button is intended to be output to the drive.

The machine advantageously has a multiplicity of drives, actuation only using the two symbols described here at least occasionally being possible for at least one of these drives and preferably for a plurality of these drives. This achieves more intuitive configuration of user interfaces, in particular by displaying a confirm button or a (graphical) confirm element (given by the second symbol, for example, in this case) depending on the situation. This makes it possible to reduce the wiring complexity, and the user interface or the display device can be configured in a more flexible manner.

As mentioned above, the second symbol, for example, can look after the function of a confirm button in this case. The abovementioned controller is advantageously a controller for the drive device. The abovementioned symbol may be configured in a wide variety of ways, for example in the form of a fingerprint which preferably changes its color when touched.

In another advantageous embodiment, the display device wirelessly communicates with the machine.

The display device is advantageously part of a so-called smart device, for example an iPad, iPod or the like.

In another advantageous embodiment, the display device is uniquely assigned to the machine. This means that the display device preferably outputs commands also having an identifier of the display device to the machine, with the result that the machine can uniquely identify the display device. This makes it possible to prevent incorrect operation by other display devices. However, wired data communication between the display device and the machine would also be conceivable.

In one preferred embodiment, the predefined command is output to the drive only when the first symbol and the second symbol have been touched in a predefined order. This makes it possible to increase safety even further since inadvertent driving of the drive and its hazard are reduced further. For example, provision may be made for the first symbol to be touched or actuated first of all and then the second symbol in order to drive the drive or initiate a particular movement.

In this case, it may be possible for the first symbol to be touched first of all and then released again and only then for the second symbol to be touched, in particular within a predefined time window. However, it would also be possible for at least occasional touching of both symbols by the user's hands to be required. This is even advantageous since, in this case, it can preferably be ensured that both of the user's hands are on the display device. The disclosure preferably enables safe movement of linear systems, in particular in automation technology.

In this case, it may be possible for the display device to likewise output the control command only when it determines that two hands of the same user are touching the display device. The display device could thus have a recognition device which allows its user to be identified.

In another advantageous embodiment, the display device is configured in such a manner that it only occasionally displays the second symbol or one of the two symbols to the user or this second symbol can only occasionally be actuated. It is thus conceivable for this second symbol to be displayed only during operations requiring confirmation and otherwise for it to be revealed to the user that confirmation by a confirm button is not required. It is thus possible for the second symbol to be only occasionally displayed, but it would be conceivable—as known per se in the prior art—for this second symbol to be stored under certain conditions in such a manner that the user recognizes that said symbol cannot be activated.

In another advantageous embodiment, the display device is configured in such a manner that it displays the second symbol to the user on the basis of an operating situation of the machine. This means that, as mentioned above, the second symbol is only displayed here depending on the situation.

This makes it possible to produce operating devices in a simple and also cost-effective manner.

Furthermore, as mentioned above, context-dependent display of confirm devices is also possible.

This means that second symbols or graphical confirm buttons are preferably displayed in a situation-dependent and preferably also context-related manner and existing machine safety guidelines can therefore also be implemented on smart devices using modern input devices. In other words, a confirm button is preferably displayed when the installation can be moved in manual mode. A two-handed condition is likewise preferably ensured by actuating the confirm button, in particular in the correct order, and the drive controllers are preferably activated or a drive is activated, as mentioned above.

A confirm button position is therefore preferably intuitively represented by a preferred graphical representation, for example a fingerprint.

The display device is advantageously configured in such a manner that it displays the actuation of at least one symbol and preferably at least the second symbol in a physically perceptible manner. For example, the symbol can change its color or shape when actuated. However, tactile confirmation, for example on the user's fingers, or else acoustic actuation would also be conceivable. A plurality of actuation mechanisms may also be combined with one another. It would also be possible for an input to additionally or alternatively be confirmed by vibration of the device or the display device (so-called haptic feedback). Touching of the symbol can therefore be confirmed to the user in two ways.

The advantage of the disclosure described here is that ultimately consumer products such as smart devices can also be used as cost-effective possibilities for operating automation installations. Operation is also simplified overall.

In another advantageous embodiment, the first symbol and the second symbol are displayed at a distance from one another which is greater than 3 cm, preferably greater than 5 cm, and particularly preferably greater than 10 cm. These distances make it possible to prevent the user from inadvertently actuating both symbols at the same time, for example by means of one finger. The even larger distances also mean that the user must inevitably make contact with the respective symbol using the fingers of two hands. For example, the two symbols could be applied to opposite edges of the display device or the user interface or, if necessary, also to diagonally opposite corner points of the display device. Operation of the drive device only with two hands of the user is therefore achieved here.

As mentioned above, the display device is preferably configured in such a manner that it displays the actuation of at least one symbol and, in particular, displays said actuation to the user in a physically perceptible manner.

At least one symbol can preferably be displayed in an edge region of the display device. In this manner, it would also be more easily possible for the user to hold the display device in his hand while actuating the relevant symbol.

Both symbols are advantageously provided in an edge region of the display device.

The present disclosure is also directed to a method for controlling a machine, the machine having at least one drive and an input device for inputting control commands for controlling this drive. In this case, the input device has a display device and a touch-sensitive surface is used to at least occasionally display a first symbol in a first region of the surface, inputs being made or a possibility for making an input being provided by touching this symbol.

According to the disclosure, the display device at least occasionally displays a second symbol in a second region of the surface, a second input being able to be made by touching this second symbol. Furthermore, a predefined control command is output to the drive or executed only when both the first symbol and the second symbol have been touched. An input is understood as meaning, in particular, an input to the display device.

It is thus also proposed, in terms of the method, that a display device, in particular a smart device, be provided and the two symbols must be actuated so that the drive is activated.

The control command is advantageously output to the drive only when the first symbol and the second symbol have been touched in a predefined manner. For example, provision may be made for the first symbol to have to be touched first of all and then the second symbol. In this case, provision may additionally be made for both symbols to be touched at least occasionally. Provision may also be made for the symbols to have to be touched in a predefined sequence, for instance twice each and alternately. This also makes it possible to implement a simple code. The situation in which only particular persons actuate particular drives could also be achieved in this manner. A combination with the input of an additional code, for instance a number combination, would also be conceivable.

In another advantageous method, the display device only occasionally displays the second symbol on the basis of an operating situation of the drive. In this case, as mentioned above, it is possible for this second symbol to be displayed only when the two-handed control is required for the drive, in particular for safety reasons.

The present disclosure is also directed to the use of smart devices for controlling drives which can be actuated with the aid of confirm buttons. In this case, according to the disclosure, a touch-sensitive surface of these smart devices looks after both the function of an input device and the function of a confirm element or confirm button.

BRIEF DESCRIPTION OF THE DRAWINGS

Further advantages and embodiments emerge from the accompanying drawings, in which.

DETAILED DESCRIPTION

Figure 1:
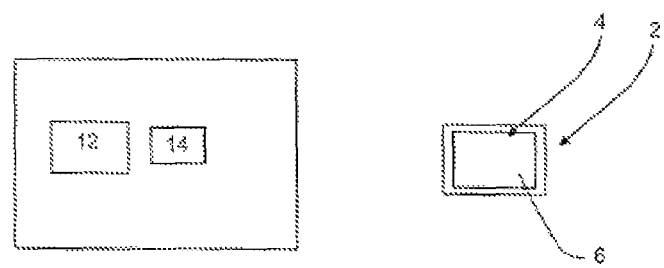
FIG. 1 shows a roughly schematic illustration of an apparatus according to the disclosure.

FIG. 1 shows a roughly schematic illustration of a machine 1 according to the disclosure. This is an automation installation, in particular. This machine itself here has at least one drive 12 as well as a control device 14 which is used to control this drive 12. This control device 14 can communicate wirelessly in this case with an input device designated by 2 in its entirety. This input device can be used to transmit control commands to the control device 14 which then accordingly controls the drive 12, for example a linear drive. In addition, the apparatus usually also has a multiplicity of further drives which can likewise be controlled by the control device 14.

The input device 2 has a touch-sensitive surface 6, that is to say commands can be transmitted by touching the surface 6 in particular regions. The input device also has a transmitting device in order to be able to transmit commands or signals to the control device 14 in a wireless manner. The reference symbol 4 denotes a display device whose part is the touch-sensitive surface 6.

Figure 2:
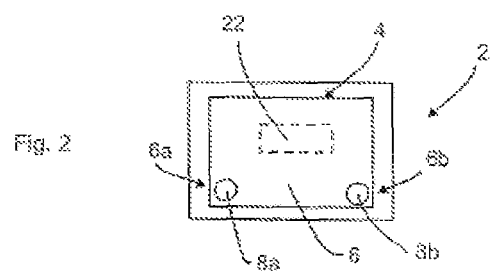
FIG. 2 shows an illustration of an input device.

FIG. 2 shows a somewhat more detailed illustration of the input device 2. The touch-sensitive surface 6 is seen here again. The reference symbol 8a denotes a first symbol which is formed in a predefined first region 6a of the surface 6, here in a left-hand lower region of the surface 6. The reference symbol 6b accordingly denotes a second region of the surface 6 in which a second symbol 8b is arranged. The two symbols 8a, 8b are therefore displayed at comparatively large distances from one another, with the result that incorrect operation by touching both symbols, in particular using only one hand, can be avoided.

Figures 3A, 3B, 3C:
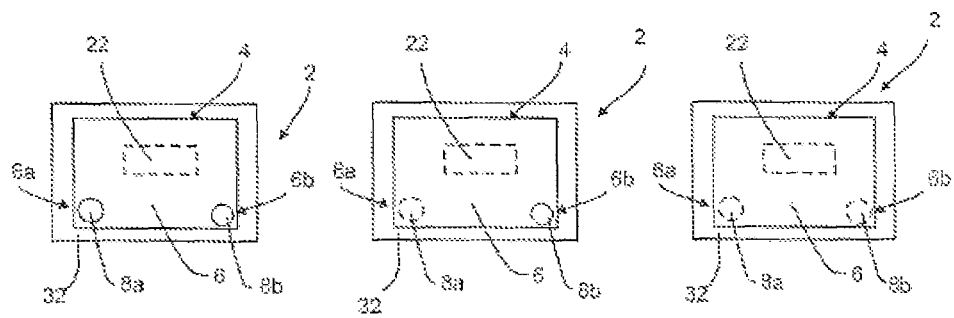
FIGS. 3a-3c show three illustrations of the input device.

FIGS. 3a-3c illustrate a possible sequence for driving the drive 12. The two symbols 8a and 8b are first of all displayed on the surface 6. This can signal to the user that a particular command can be executed only with the aid of a "confirm button" (symbol 8b). The user is now requested (this may be effected, for example, using a text prompt in the display device 4 but may also be effected acoustically, if necessary) to touch the left-hand symbol 8a with a finger. In response, the touching of this symbol 8a is confirmed, as shown in FIG. 3b. This may be effected, for example, by changing the color of the symbol to green. Furthermore, the user may now be requested to also touch the second symbol 8b, for which purpose he must use a further finger, for example the thumb of the right hand, and therefore must use both hands. The actuation or touching of the second symbol 8b is now also confirmed in FIG. 3c. As a result of both symbols 8a and 8b being touched, the drive is released and can carry out a particular movement, for example. The reference symbol 22 denotes a representation which illustrates the drive itself, for example. In this case, a particular movement carried out by this drive can also be illustrated in this representation 22.

Depending on the machine situation, the symbol 8b can also be masked, in particular when the intention is to actuate those drives for which separate confirmation is not required.

In addition, it may also be possible to stipulate, in a user-defined manner, for which driving operations the second symbol 8b is intended to flash or be shown and for which it is not.

The applicant reserves the right to claim all features disclosed in the application documents as essential to the disclosure if they are novel over the prior art individually or in combination.

LIST OF REFERENCE SYMBOLS

1 Machine
2 Input device
4 Display device
6 Surface
6a First region
6b Second region
8a First symbol
8b Second symbol, confirm button
12 Drive
14 Control device
22 Representation

What is claimed is:

1. A control device for a machine comprising at least one drive, the control device comprising: at least one input device comprising: a display device; and a touch sensitive surface integrated with the graphical display; a wireless transmitter; and the control device being configured to: generate a display of a first symbol in a first region of the display device; generate a display of a second symbol in a second region of the display device, the first symbol in the first region being separated from the second symbol in the second region by a predetermined distance, wherein the second symbol is a confirmation button; and receive a first input from a user via the touch sensitive surface in response to simultaneous contact with a first hand of the user to the first symbol in the first region and contact with a second hand of the user to the second symbol in the second region, receive a second input from the user via the touch sensitive surface in response to simultaneous contact with the first hand of the user to the first symbol in the first region and contact with the second hand of the user to the second symbol in the second region, the touch sensitive surface receiving the second input after the first input; wherein the control device is configured to transmit a command signal with the wireless transmitter to activate the at least one drive in the machine only in response to the first input, the command signal comprising an identifier of the display device, and another command signal to continue the activation of the at least one drive in the machine only in response to the second input; and wherein the control device is configured to only transmit the command signal if the first symbol and the second symbol were touched in a predefined sequence.

2. The control device of claim 1 wherein the predetermined distance between the first region and the second region is at least 10 cm to require the user to use the first hand and the second hand to provide the first input.

3. The control device of claim 1, wherein the predefined sequence of the first input includes two touches of the first symbol and two touches of the second symbol.

4. The control device of claim 1, wherein the machine changes at least one of a speed, direction of movement, and acceleration of the at least one drive in response to the command signal.

5. A method of operating a control device for a machine comprising at least one drive: generating, with a display device in the control device, a display of a first symbol in a first region of the display device; generating, with the display device, a display of a second symbol in a second region of the display device, the first symbol in the first region being separated from the second symbol in the second region by a predetermined distance, wherein the second symbol is a confirmation button; receiving, with a touch sensitive surface integrated with the graphical display, a first input from a user via the touch sensitive surface in response to simultaneous contact with a first hand of the user to the first symbol in the first region and contact with a second hand of the user to the second symbol in the second region; receiving, with the touch sensitive surface integrated with the graphical display, a second input from the user via the touch sensitive surface in response to simultaneous contact with a first hand of the user to the first symbol in the first region and contact with a second hand of the user to the second symbol in the second region; and transmitting, with a wireless transmitter in the control device, a command signal to activate the at least one drive in the machine only in response to the first input, the command signal comprising an identifier of the display device, and another command signal to continue the activation of the at least one drive in the machine only in response to the second input; and wherein the control device is configured to only transmit the command signal if the first symbol and the second symbol were touched in a predefined sequence.

6. The method of claim 5 wherein the predetermined distance between the first region and the second region is at least 10 cm to require the user to use the first hand and the second hand to provide the first input.

7. The method of claim 5, wherein the predefined sequence of the first input includes two touches of the first symbol and two touches of the second symbol.

8. The method of claim 5, the transmitting further comprising:

transmitting, with the wireless transmitter in the control device, the command signal to the machine to change at least one of a speed, direction of movement, and acceleration of the at least one drive.

9. A machine comprising: at least one drive; a control device, comprising: at least one input device comprising: a display device; and a touch sensitive surface integrated with the display device; a wireless transmitter; and the control device being configured to: generate a display of a first symbol in a first region of the display device; generate a display of a second symbol in a second region of the display device, the first symbol in the first region being separated from the second symbol in the second region by a predetermined distance, wherein the second symbol is a confirmation button; receive a first input from a user via the touch sensitive surface in response to simultaneous contact with a first hand of the user to the first symbol in the first region and contact with a second hand of the user to the second symbol in the second region; and receive a second input from the user via the touch sensitive surface in response to simultaneous contact with the first hand of the user to the first symbol in the first region and contact with the second hand of the user to the second symbol in the second region, the touch sensitive surface receiving the second input after the first input; wherein the control device is configured to transmit a command signal with the wireless transmitter to activate the at least one drive in the machine only in response to the first input, the command signal comprising an identifier of the display device, and another command signal to continue the activation of the at least one drive in the machine only in response to the second input; and wherein the control device is configured to only transmit the command signal if the first symbol and the second symbol were touched in a predefined sequence.

10. The machine of claim 9, the control device being further configured to:
transmit the command signal with the wireless transmitter to change at least one of a speed, direction of movement, and acceleration of the at least one drive.

\* \* \* \* \*